Nov. 10, 1964   C. A. BARATELLI   3,155,982
EYESHIELD
Filed May 7, 1962   2 Sheets-Sheet 1
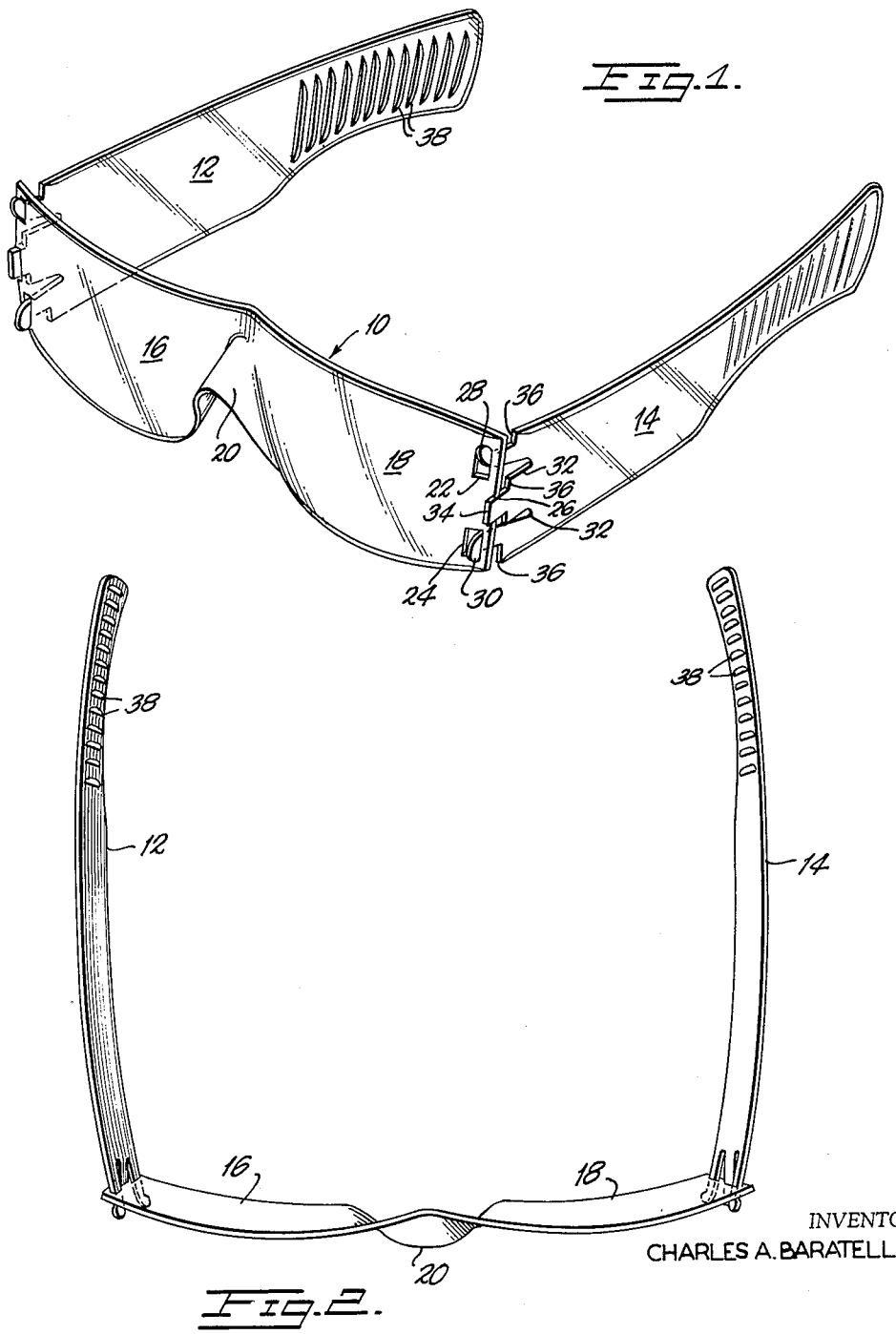
INVENTOR
CHARLES A. BARATELLI

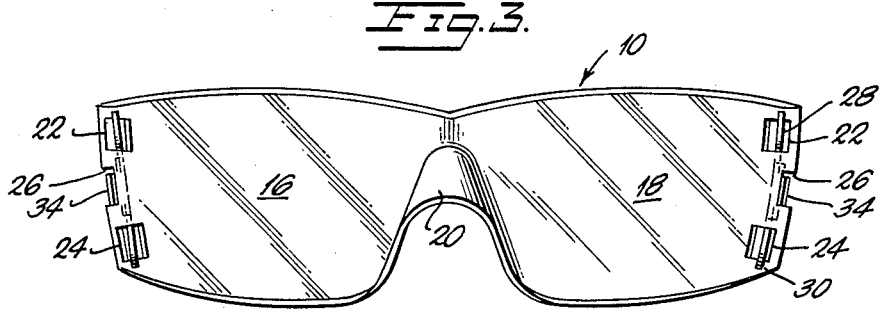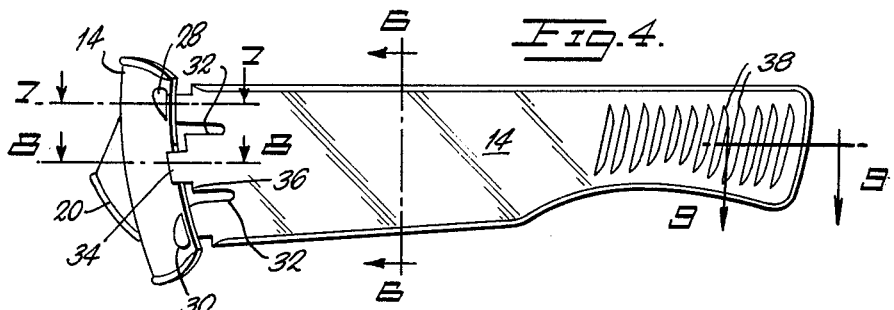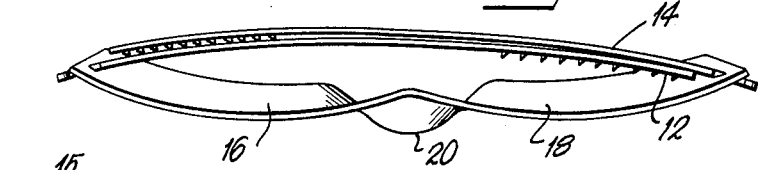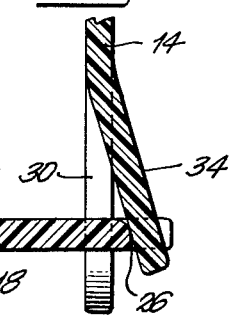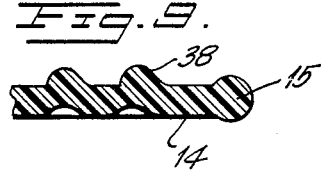

United States Patent Office 3,155,982
Patented Nov. 10, 1964

3,155,982
EYESHIELD
Charles A. Baratelli, Reading, Pa., assignor to Pennsylvania Optical Company, Reading, Pa., a corporation of Pennsylvania
Filed May 7, 1962, Ser. No. 192,652
7 Claims. (Cl. 2—12)

This invention relates to improvements in eyeshields adapted particularly for use as sunglasses but also as general protective shields such as for industrial uses.

The principal object of the invention is to provide an eyeshield which is extremely simple in construction and inexpensive in cost yet which is extremely efficient and durable in use.

Another object of this invention is to provide an eyeshield formed of a minimum number of parts critically constructed so that they may be quickly and securely assembled to form an operative eyeshield at a minimum time and expense and without need of any additional fastening elements or the like.

It is a further object of the invention to provide an eyeshield wherein the temples are subjected to a spring action tending firmly to fit the temples to the head of the user or to closed folded position when the eyeshield is not in use.

Another object of the invention is to provide an eyeshield having means on the inner faces of the temples for maintaining secure frictional contact with the head of the user.

Other objects and advantages will be apparent from the following detailed explanation taken in conjunction with the accompanying drawings wherein a preferred embodiment of the principles of the invention has been selected for exemplification.

In the drawings:

FIG. 1 is a perspective view of an eyeshield constructed in accordance with the present invention;

FIG. 2 is a top plan view;

FIG. 3 is a front elevational view;

FIG. 4 is a side view;

FIG. 5 is a top plan view of the temples shown in closed folded position;

FIG. 6 is an enlarged sectional view taken along the line 6—6 of FIG. 4 showing a preferred cross-sectional configuration of the temples;

FIG. 7 is an enlarged fragmentary sectional view taken along the line 7—7 of FIG. 4 and showing a hinge portion of a temple in solid line open position and in broken line closed position;

FIG. 8 is an enlarged fragmentary sectional view taken along the line 8—8 of FIG. 4 and showing the resilient tongue carried by each of the temple members; and FIG. 9 is an enlarged fragmentary sectional view taken along the line 9—9 of FIG. 4 and showing the serrations or projections at the inner faces of the temple members.

Referring more particularly to the drawings, wherein like numerals refer to like parts, the eyeshield, as shown, is composed of three essential parts, a one-piece eyeshield member 10 and a pair of identical temples 12 and 14, respectively, preferably with beaded side edges 15 as shown in FIG. 6. The parts 10, 12 and 14 may be of any suitable plastic material, translucent or transparent, depending upon the use for which the eyeshield is intended and the parts may be molded or stamped out of sheet material with suitable dies.

The eyeshield member 10 is provided with opposed viewing portions 16 and 18 and an interposed formed nose engaging portion 20. The viewing portions 16 and 18 may be flat or provided with any desired curvature, such as that shown in the illustrated embodiment of the eyeshield. The side marginal edge portions of the eyeshield member 10 are provided each with upper and lower hinge openings 22 and 24, respectively, and the marginal edges are provided each with a central edge slot 26 intermediate the elevations of the hinge openings 22 and 24.

For completing the hinge connections between the eyeshield member 10 and the temples 12 and 14, each temple at its forward end is formed with upper and lower hinge tongues 28 and 30, respectively, the said hinge tongues having upwardly and downwardly turned extremities, respectively, as shown. The hinge tongues 28 and 30 are for insertion in the hinge openings 22 and 24, respectively, and, for facilitating such insertion, slots or grooves 32 are provided at the forward end portions of the temples between the hinge tongues and an intervening resilient tongue element 34 to allow for slight contraction of the hinge tongues 28 and 30 when compressed by the fingers toward each other so that the hinge tongues 28 and 30 may freely enter the openings 22 and 24 whereupon release of compression will cause the upwardly and downwardly turned extremities to spring apart and engage the adjacent front faces of the eyeshield member 10, thus hingedly to secure the temples to the eyeshield member. Shoulders 36 are provided adjacent the bases of the hinge tongues to limit the extent of their insertion in the openings 22 and 24.

The resilient tongues 34 each have a free end extremity generally in the plane of the tongue, as shown. The resilient tongue 34 and central marginal edge slot 26, mentioned above, control actuation of the temples 12 and 14 and cooperate to provide an important feature of the invention. When the temples are in hinged engagement with the eyeshield member the resilient tongues are in slidable engagement with the marginal edge slots and operate in the nature of leaf springs to urge the temples toward each other for firm engagement with the head of the user or in closed folded position for storage when the eyeshield is not in use, as shown in FIG. 5. The function of the resilient tongue member 34 is best illustrated in the enlarged fragmentary views of FIGS. 7 and 8 showing the right hand end of the eyeshield but also showing the left hand end in mirror reverse. In FIG. 8 the temples are in open operative position and the resilient tongues 34 are bent outwardly and placed under tension to urge the temple members against the temple areas of the user's head. In FIG. 7 the temples members, as shown in broken lines, are in the closed folded position shown in FIG. 5 when the tension is released and the tongues 34 assume an extension of the plane of the temple members. Shoulders 36 provided on the hinge tongues 34 limit the forward movement of the tongues in the edge slots 26 and thus limit the outward movement of the temples in open position.

It will be apparent that the normal position of the eyeshield is the closed temple folded storage condition shown in FIG. 5 and that when the temples are pulled manually outwardly to open position and applied to the user they will be spring pressed against the user's head. For further increasing frictional or gripping contact of the temples with the head, projections or serrations 38 may be molded or otherwise provided on the inner faces of the temples.

It is to be understood that the present invention is not confined to the precise construction herein illustrated and described but embraces all such modifications thereof as may come within the scope of the following claims.

I claim:

1. An eyeshield comprising a one-piece eyeshield member with viewing portions and an interposed nose engaging portion, said eyeshield member having side marginal edges spaced upper and lower hinge openings inwardly of each of the side marginal edges thereof and a central edge slot at each of said marginal edges, a pair of temples each having spaced upper and lower hinge tongues at their forward ends extending through said openings, said hinge tongues having respectively upwardly and downwardly turned extremities for engaging adjacent front face portions of said eyeshield member, and a resilient tongue having a free end extremity generally in the plane of the tongue carried by each of said temples between said hinge tongues for engaging each of said central edge slots, the said resilient tongues, when the temples are in open operative position, being bent outwardly of the planes of the temples and placed under tension whereby to urge the temples toward closed position and, when the temples are in closed storage position, lying substantially in the planes of the temples.

2. The eyeshield of claim 1 wherein the resilient tongues are in slidable engagement with the central edge slots and tend to urge the temples toward each other for firm engagement with the head of the user or to closed folded position.

3. The eyeshield of claim 1 wherein the resilient tongues are provided with shoulders disposed rearwardly of their free end extremities for limiting movement of the temples forwardly of the eyeshield member.

4. The eyeshield of claim 1 wherein slots are provided at the forward end portions of the temples between the hinge tongues and the intervening resilient tongue to provide space for compression of the hinge tongues for insertion in their hinge openings.

5. The eyeshield of claim 1 wherein projections are provided along the inner faces of the rearward portions of the temples whereby to promote gripping contact of the temples with the user's head.

6. An eyeshield comprising a one-piece eyeshield member with viewing portions and an interposed nose engaging portion, said eyeshield member having side marginal edges and spaced upper and lower hinge openings inwardly of each of the side marginal edges thereof, a pair of temples each having spaced upper and lower hinge tongues at their forward ends extending through said openings, said hinge tongues having laterally turned extremities for engaging adjacent front face portions of said eyeshield member, and a resilient tongue having a free end extremity generally in the plane of the tongue integral with each of said temples between said hinge tongues for engaging each side marginal edge of said eyeshield member, the said resilient tongues, when the temples are in open operative position, being bent outwardly of the planes of the temples and placed under tension whereby to urge the temples toward closed position and, when the temples are in closed storage position, lying substantially in the planes of the temples.

7. An eyeshield comprising a one-piece eyeshield member with viewing portions and an interposed nose engaging portion, said eyeshield member having side marginal edges and spaced upper and lower hinge openings inwardly of each of the side marginal edges thereof and a central edge slot at each of said marginal edges, a pair of temples each having spaced upper and lower hinge tongues at their forward ends extending through said openings, said hinge tongues having laterally turned extremities for engaging adjacent front face portions of said eyeshield member, and a resilient tongue having a free end extremity generally in the plane of the tongue carried by each of said temples between said hinge tongues for engaging each of said central edge slots, the said resilient tongues, when the temples are in open operative position, being bent outwardly of the planes of the temples and placed under tension whereby to urge the temples toward closed position and, when the temples are in closed storage position, lying substantially in the planes of the temples.

References Cited in the file of this patent

UNITED STATES PATENTS

| 1,017,702 | Swartwout | Feb. 20, 1912 |
| 2,527,027 | Mull | Oct. 24, 1950 |
| 2,582,554 | Mendelsohn | Jan. 15, 1952 |
| 2,630,569 | Baratelli et al. | Mar. 10, 1953 |
| 2,706,774 | Bowman | Apr. 19, 1955 |

FOREIGN PATENTS

| 883,824 | France | Apr. 5, 1943 |
| 608,059 | Great Britain | Sept. 9, 1948 |